(12) United States Patent
Khuntia

(10) Patent No.: US 9,146,447 B2
(45) Date of Patent: Sep. 29, 2015

(54) CAMERA INTEGRATED WITH DIRECT AND INDIRECT FLASH UNITS

(76) Inventor: Alok Khuntia, Berywn, IL (US)

( * ) Notice: Subject to any disclaimer, the term of this patent is extended or adjusted under 35 U.S.C. 154(b) by 690 days.

(21) Appl. No.: 12/855,437

(22) Filed: Aug. 12, 2010

(65) Prior Publication Data
US 2010/0322613 A1    Dec. 23, 2010

Related U.S. Application Data

(62) Division of application No. 12/070,009, filed on Feb. 14, 2008, now Pat. No. 7,801,438.

(51) Int. Cl.
| G03B 15/03 | (2006.01) |
| G03B 15/06 | (2006.01) |
| G03B 15/02 | (2006.01) |

(52) U.S. Cl.
CPC .............. G03B 15/06 (2013.01); G03B 15/02 (2013.01)

(58) Field of Classification Search
USPC ......... 396/155, 157–158, 174–176, 198, 199; 348/370–371
See application file for complete search history.

(56) References Cited

U.S. PATENT DOCUMENTS

| 4,384,238 A * | 5/1983 | Greenwald et al. ........... 315/151 |
| 4,512,644 A | 4/1985 | Yoshida |
| 4,657,367 A * | 4/1987 | Kataoka ....................... 396/157 |
| 4,855,771 A | 8/1989 | Alligood et al. |
| 4,893,139 A | 1/1990 | Alligood et al. |
| 5,121,155 A | 6/1992 | O'Such et al. |
| 5,124,740 A | 6/1992 | Wheeler |
| 5,126,778 A | 6/1992 | Wheeler et al. |
| 5,136,312 A * | 8/1992 | Weaver et al. .................. 396/61 |
| 5,194,885 A | 3/1993 | Spencer |
| 5,287,134 A * | 2/1994 | Cocca ........................... 396/203 |
| 5,315,342 A | 5/1994 | Cocca |
| 5,392,090 A | 2/1995 | Stephenson, III |
| 5,416,543 A * | 5/1995 | Stephenson ................... 396/207 |
| 5,418,596 A * | 5/1995 | Goto ............................. 396/106 |
| 5,528,333 A * | 6/1996 | Lee ................................ 396/165 |
| 5,717,964 A * | 2/1998 | Dowe ............................ 396/165 |
| 6,067,422 A | 5/2000 | Tokunaga et al. |
| 6,614,999 B2 * | 9/2003 | Hagiuda et al. ............... 396/155 |
| 6,754,447 B2 * | 6/2004 | Lee et al. ...................... 396/159 |
| 2004/0234259 A1 * | 11/2004 | Muramatsu .................. 396/157 |
| 2005/0134691 A1 * | 6/2005 | Cox ........................... 348/207.99 |
| 2007/0195193 A1 * | 8/2007 | Kawakami .................... 348/371 |

OTHER PUBLICATIONS

The Advantages of Luxeon Flash Power LEDs versus Xenon Technology for Digital Photography.

* cited by examiner

*Primary Examiner* — Minh Phan
(74) *Attorney, Agent, or Firm* — Attentive Law; Paul Ratcliffe

(57) ABSTRACT

A compact camera with a compact camera body integrated with a lens, a direct flash module and an indirect flash module. The direct flash unit includes a flash light emission window arranged to project direct illumination in a first direction toward an object to be photographed. The indirect flash unit includes an indirect flash light emission window arranged to project indirect bounce illumination in a second direction off of an indirect reflecting surface to the object. The camera also has a controller that receives a first signal containing information from a first light sensor connected to the direct flash unit, and a second signal containing information from a second light sensor connected to the indirect flash unit. In response to the received first and second signals, the controller selectively adjusts the amount of flash illumination projected from the direct and indirect flash units.

21 Claims, 5 Drawing Sheets

CAMERA INTEGRATED WITH DIRECT AND INDIRECT FLASH UNITS

CROSS REFERENCE TO RELATED APPLICATION

This application is a divisional of U.S. patent application Ser. No. 12/070,009 filed on Feb. 14, 2008 now U.S. Pat. No. 7,801,438 issued Sep. 21, 2010, entitled "Camera Integrated with Direct and Indirect Flash Units", the entirety of which is incorporated herein.

BACKGROUND OF THE INVENTION

1. Field of the Invention

The present invention relates generally to a photography camera that provides direct and indirect flash capabilities, and more particularly to an automated compact camera including a built-in, indirect, flash unit that provides optimized indirect reflective illumination to the object being photographed.

2. Description of the Related Art

Photographers continually suffer with finding a solution to diffusing the detrimental effects caused by harsh direct flash. Intense direct flash is unfavorable in that the flash light source is a harsh point source of light. One skilled in the art of photography understands that "bounce flash," (i.e., flash aimed away from the object, such as at a light-colored surrounding wall and/or ceiling which is allowed to bounce toward the object) is one solution that will soften the intense illuminating and shadowing effects of direct flash and cast a smoother continuous hue of neutral lighting on the object being photographed to produce a more pleasing photograph.

In a studio, a professional photographer can modify the lighting conditions and flash in just about every way so that it does not produce harsh light. The two most common methods for redirecting the light are to use a soft box and/or an umbrella. The soft box allows you to fire the flash directly, but through a soft-shelled box that bounces the light around over a larger surface before being directed through a translucent cover. The umbrella spreads the light from the flash over a larger surface area (the inside of the umbrella), but instead of being fired directly, the flash is reversed and fires into the umbrella so that the object being photographed is bathed in soft, indirect light. The disadvantage of these two methods is that the cumbersome external devices (the soft box and the umbrella) are required for enhanced lighting and must be set up and manipulated to obtain optimal lighting. Consequently, much preparation time is required and a user cannot effectively shoot on the go or in casual settings with soft boxes and umbrellas.

There is a long felt need in the photography industry to enhance the lighting by using external indirect flash units. Including an indirect flash unit substantially equal in size to existing direct flash units in compact cameras is not practical because the indirect flash would be vastly underpowered for its intended purpose. Conventional attempts to include the existing indirect flash technology that would be capable of replicating the effective lighting of an accessory flash (e.g., xenon strobe based) in the housing of an existing compact camera will result in increasing the dimensions of the camera by at least 2-4 times.

By way of background, a guide number (GN) is used to indicate how much light a flash will produce when it goes off. As the GN gets higher, the intensity of the light increases as well as the distance the light can travel. GNs are measured in feet (or meters). Many factors will affect the physical distance the flash can cover: from outdoors to indoors, the amount your flash can light up will vary. Most GNs assume that your digital camera is set to ISO 100.

The GN and capacitor size are roughly proportional. Various GNs are assigned for various elements in the camera, such as for example: the GN for current compact flash cameras and disposables is approximately 6-8; the GN for internal flashes in DSLRs is approximately 11-15; the GN for external hot shoe flashes is approximately 30-50; and the GN for an indirect flash in a compact camera or DSLR should be approximately 20+ which would require a capacitor about the size of a C-cell battery which is not compactly practical.

Various expensive and ingenious on-camera flash unit attachment alternatives have been proposed, such as a hard hat with a flash mounted thereon, an external flash bracket that mounts the flash higher to push shadows down lower, and/or attaching cumbersome indirect flash units (such as shown and described in U.S. Pat. No. 5,136,312 which is incorporated herein by reference in its entirety) yet none have proposed integrating an adjustable bounce flash unit in a compact manner directly into a camera that can be easily manipulated by a lay consumer.

SUMMARY OF THE INVENTION

An object of the present invention is to provide a system and method for a compact camera integrated with direct and indirect flash capabilities. The automated compact camera (such as a Point and Shoot or Digital Single Lens Reflex (SLR) includes built-in direct and indirect flash units providing optimized direct and indirect reflective illumination to the object being photographed.

The direct flash unit includes a flash light emission window arranged to project direct illumination in a first direction toward an object to be photographed. The indirect flash unit includes another indirect flash light emission window arranged to project indirect bounce illumination in a second direction off of an indirect reflecting surface to the object.

This invention also relates to the integration of sensors and software related to the flash settings, exposure settings and other features of the camera. The camera includes a controller that receives a first signal containing information from a first light or distance sensor connected to the direct flash unit, and a second signal containing information from a second light or distance sensor connected to the indirect flash unit. In response to the received first and second signals, the controller selectively adjusts the amount of flash illumination projected from the direct and indirect flash units. Likewise, in response to the information received from the first and second signals, the indirect flash unit can be angularly adjusted to project flash lighting in an optimal direction to cast the best light on the object being photographed.

It is a further object of this invention to solve the problem of integrating indirect flash technology directly into a camera while preserving the compact miniature nature of the photographic device. In a preferred embodiment the invention incorporates the use of flash power light emitting diodes (LED) although the invention could employ conventional xenon based flash technology.

Power LEDs are comparable in illumination to a xenon flash, yet superior in numerous other facets. The LED is easier to design and is more flexible in its operating mode. The LED is small in physical size, and holds a longer battery charge. Likewise, the drive requirements for power LEDs do not require high peak voltages like xenon tubes require, thus, the LED driver is substantially more compact and requires fewer components of smaller physical size.

According to another aspect of the present invention the improved camera provides a method of providing flash illumination for a camera integrated with a direct flash unit and an indirect flash unit. The method includes sensing an amount of light reflected from a reflecting surface adjacent to the camera and based on the received information, an appropriate power level is determined and sent to an indirect flash unit. The indirect flash unit is then instructed to project a flash toward the reflecting surface according to the determined power level. Likewise, an amount of light reflected from an object to be photographed is also received, and appropriate power level is determined and sent to the direct flash unit. Based on the direct flash power determination, the direct flash unit is instructed to project a predetermined amount of flash toward the object.

According to yet another aspect of the present invention the improved camera provides an orientation sensor and control feature so that the indirect flash unit moves to accommodate the orientation of the camera. In particular, when the user changes an orientation of the camera (e.g., from horizontal to vertical), the indirect flash is modified from a top flash to a side flash being used as the indirect flash. The altering of a preferred indirect flash unit may be determined mechanically or electronically.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

Figure 1:
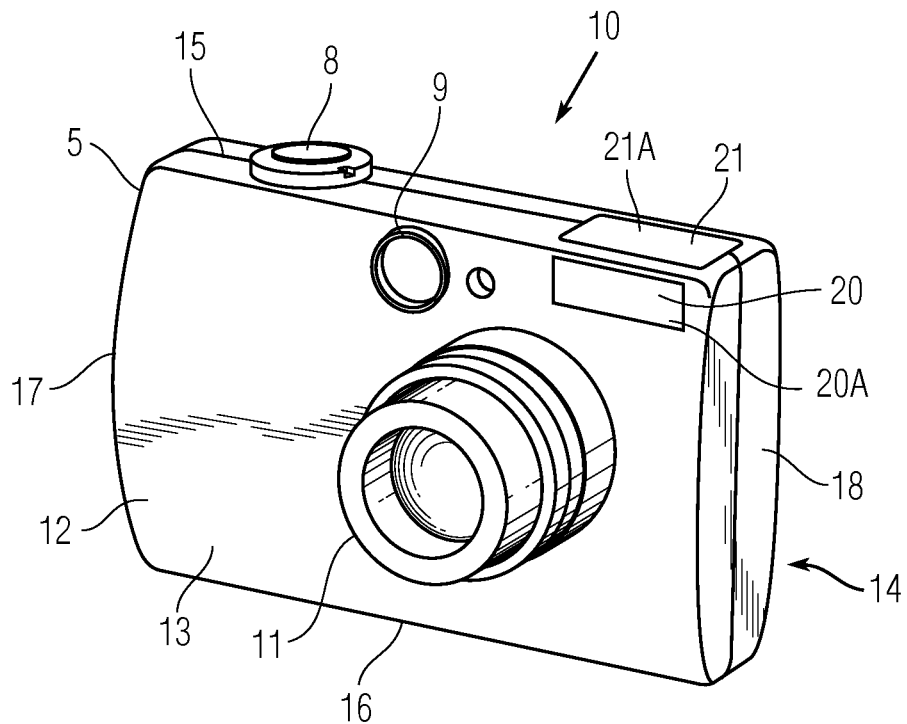
FIG. 1 depicts an exemplary view of a camera integrated with a direct flash unit and an indirect flash unit in accordance with this invention.

Particular embodiments of the present invention will now be described in greater detail with reference to the figures. Like reference numerals apply to similar parts throughout the several views.

This invention overcomes the conventional problems described above by providing an automated compact camera such as a point-and-shoot or DSLR including a built-in, indirect, flash unit that provides optimized indirect reflective illumination to the object being photographed. In general, in a first embodiment, the camera will utilize a two-flash system. The camera provides a conventional single direct flash camera and adds at least one set of flash components. The at least one additional sets of flash components would be embodied as an indirect flash unit.

The indirect flash unit may be pointed in a direction which would cause the projected light to bounce off of a wall, a ceiling or a surface prior to illuminating the object. The direct flash unit would trigger the indirect flash every time the main direct flash fires. The f-stop may be reduced slightly to account for entry of additional light.

The advantage of this configuration over direct-only flash produced photos is a significant improvement. However, the disadvantage of employing conventional circuitry for use with a conventional xenon flash unit is that the capacitor embedded within the circuitry of a conventional camera is too small to handle much more than the direct xenon flash unit. Conventional capacitors lack power and cannot provide substantial indirect flash illumination as well as direct flash without compromising the size of the compact camera. The capacitor alone would have to be increased in size to roughly that of an AA to C size battery thereby yielding (the once compact camera) to a cumbersome non-compact design.

FIG. 1, in more detail, illustrates an exemplary two-flash compact camera system 10 for capturing images in accordance with this invention. The camera 5 is comprised of a housing 12 including a front side 13, a rear side 14, a top side 15, a bottom side 16, a left side 17, and a right side 18. As shown, a view finder 9 and a telescopic lens 11 are disposed on the front side 13 of the camera 5. An image trigger button 8 is disposed on the top side 15 of the camera 5.

According to yet another aspect of this invention, the camera system 10 may be constructed as a three-flash compact camera system 10. In brief, a once existing digital camera (e.g., a point and shoot, or SLR) may be integrated with one or more flash units. The flash units may be oriented in a variety of different directions, including but not limited to being pointed sideways as shown and discussed in combination with FIG. 2.

Figure 2:
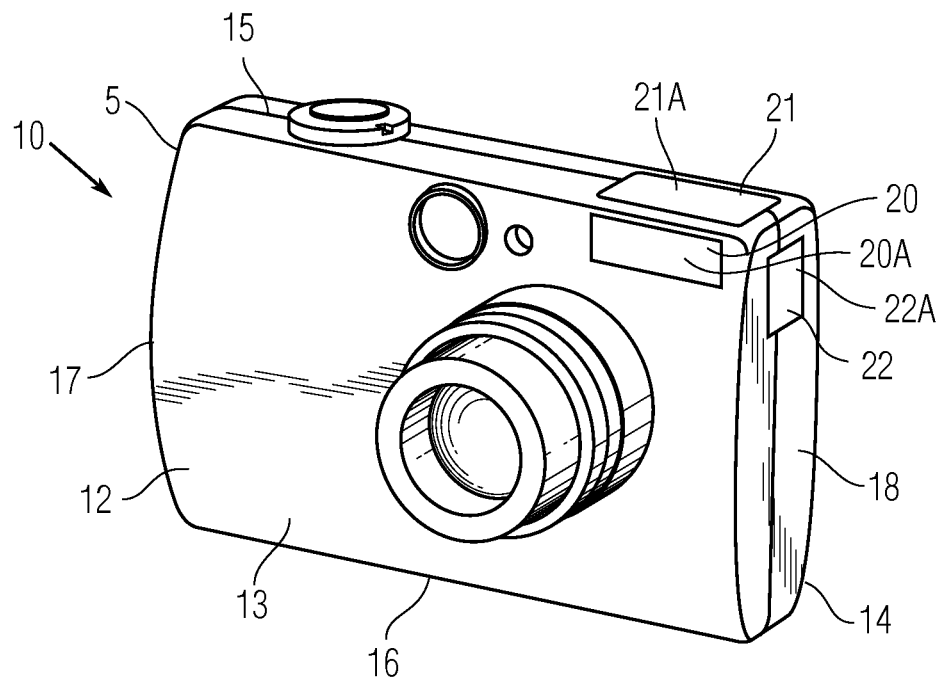
FIG. 2 depicts another exemplary view of a camera integrated with a direct flash unit and a pair of indirect flash units in accordance with this invention.

FIG. 2 depicts a three-flash compact camera system 10. The various flash units 20a, 21a, 22a are disposed within compartments below the flash light emission windows 20, 21, 22 on the camera 5. In particular, a first direct flash light emission window 20 is disposed on the front side 13 of the camera 5. The direct flash light emission window 20 is arranged to project direct illumination in a first direction toward an object to be photographed.

Referring to FIG. 1, the various indirect flash light units 21a, 22b are housed within respective indirect flash light windows 21, 22. A first indirect flash light emission window 21 is shown disposed on the top side 15 of the camera 5. A second indirect flash light emission window 22 is also depicted on the right side 18 of the camera 5. The indirect flash light emission windows 21, 22 are arranged to project indirect bounce illumination in a direction different from the direction of the direct flash light unit 20a. It is to be understood that the flash units and/or direct or indirect flash light emission windows may be positioned at a variety of different positions on the camera 5. The flash units 20a, 21a, 22a utilized as part of this invention may be selected from an assortment of available illumination sources (individually or separately), including but not limited to xenon flash, light emitting diode (LED) or other suitable compact light source.

Figure 4:
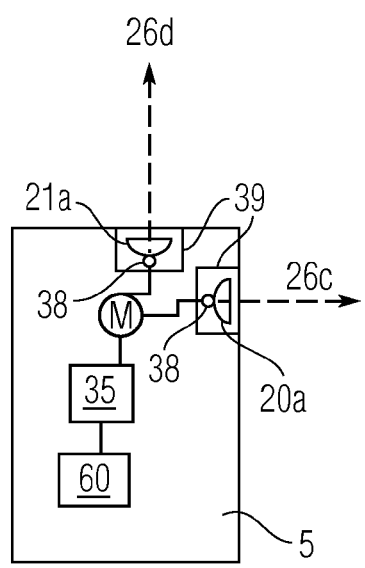
FIGS. 4 and 5 depict an exemplary illustration of the adjustment mechanism of the camera system adjusting the flash light units from a first position to a second position according to this invention.
Figure 5:
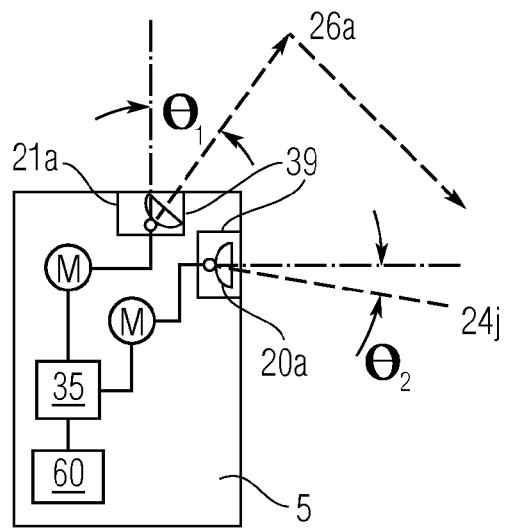

Another aspect of the present invention is to provide a position sensor 60 (as shown in FIGS. 4-5). The position sensor 60 (and/or vertical/horizontal sensor) is provided to determine the orientation (such as from a horizontal to a vertical position) of the camera 5. As such, when the orientation is changed, the side indirect flash unit 22a now becomes the preferred indirect top flash unit. Accordingly, only one indirect flash unit may be preferred for use when the camera 5 captures the image. In the alternative, it is possible to use more than one of the indirect flash units 21a, 22a simultaneously.

Once the orientation of the camera 5 is determined, the position sensor 60 returns that information in the form of a signal to a controller 35 (as will be described in more detail later). Various types of position sensors (i.e., vertical/horizontal measuring sensors) may be incorporated (such as an accelerometer or a gyroscope) to determine the orientation of the camera 5 relative to the ground.

For example, the accelerometer (as the position sensor 60) can sense and determine the angular displacement using the direction of gravity as a vertical reference. Likewise, the position sensor 60 may determine and selectively identify which of the various indirect flash units 21a, 22a should be used to direct the flash illumination towards a particular reflecting surface, such as the ceiling. Based on the determination made by the controller 35 (e.g., in response to other unknown reflectivity objects such as a wall, other objects and/or bystanders), the other indirect flash units may be turned off. The altering of which indirect flash unit to be used may be determined mechanically (for example by the user) or electronically (for example by the controller 35).

According to yet another aspect of this invention, conventional xenon direct flash units may be replaced by at least one or more LED flash units capable of illuminating comparable luster within the color spectrum as with conventional xenon flash technology.

The advantage of employing LEDs, as opposed to xenon flash tubes, is that large high voltage capacitors and bulky circuit components are not required with LEDs thereby fostering miniaturization of compact cameras. Likewise, LEDs can be implemented with fewer components and an overall smaller physical size. Unlike xenon flash units, LED drivers are much smaller and can be driven directly by integrated circuits (IC) containing high current pulse drivers. By way of comparison, a complete driver for an LED flash can occupy less than 10 percent of the volume of a comparable xenon driver.

In the alternative, LEDs may be driven by lower voltage super-capacitor circuits that are significantly smaller than conventional high voltage photoflash capacitors, such as for example the GS-line of supercapacitors from the Australian based company CAP-XX® which resolve the power and performance limitations of conventional batteries. The drive requirements for power LEDs do not require high peak voltages like xenon tubes require. It is important to note that a capacitor is optional for an LED flash, whereas a xenon flash cannot operate without a capacitor.

LEDs are significantly smaller and slimmer than xenon systems allowing for smaller camera designs. LEDs also require less power and will lead to lower overall system costs. Unlike xenon solutions, power LEDs offer enhanced variable operating modes such as torch, flash and high speed repeated flash, thereby creating opportunities for differentiation and greater, more valuable, functionality.

An LED easily matches the performance of xenon technology and does so in a much more compact manner and smaller volume. Unlike cumbersome xenon flash tubes which have lower life spans and demand higher power sources, LEDs sustain their flash life much longer and at a significantly reduced power. Furthermore, LEDs do not require constant recharge after each discharge. For example, a typical xenon flash has a duration of about 1 ms. On the other hand, a very bright burst of white LED light can be sustained for a duration of hundreds of milliseconds which allows for extended shutter opening that is desirable by the camera operator under a variety of situations.

Electronic control of a power LED is more flexible and includes greater flexibility in its operating modes (such as in torch mode or video mode). The prolonged operation at high light output allows night-time camera use in video mode as well as still camera mode. Similar operating modes and features cannot be supported by conventional xenon technology.

Another advantage of LED technology is that the range and spread of LED flash can be substantially optimized. For example, a lens can be used to focus the beam at a long range thereby enabling zoom flash modes. As shown by this invention, the LED is proven to be far more versatile and superior to conventional xenon flash technology in terms of miniaturization, versatility, form factor, and time to market.

Figure 3:
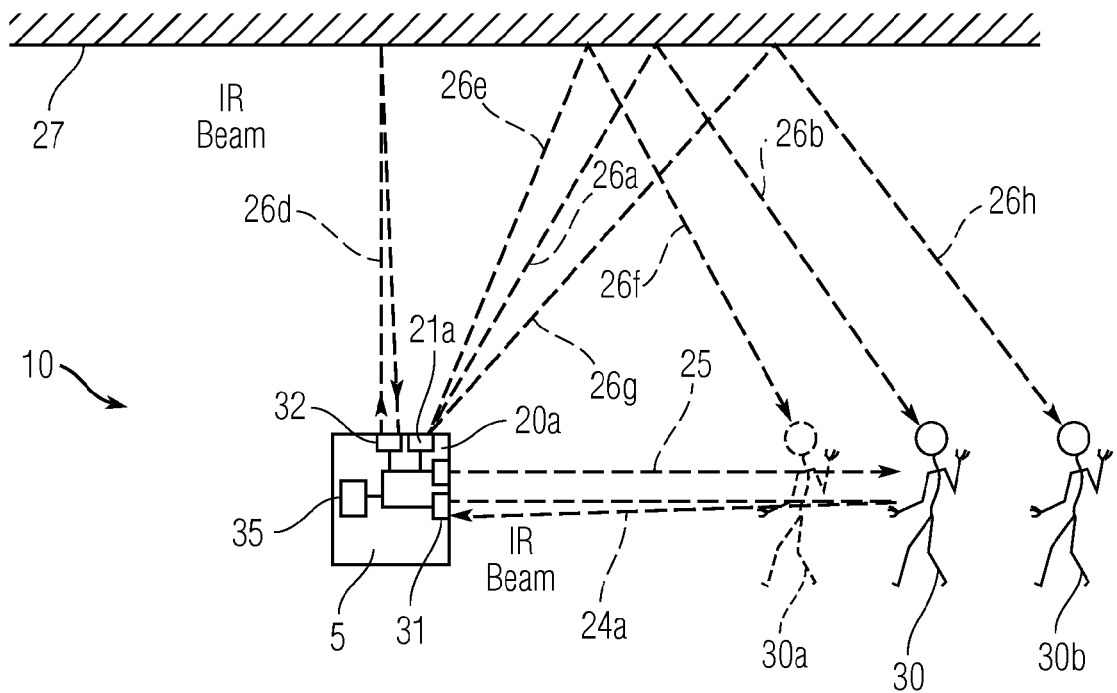
FIG. 3 illustrates a diagrammatic view illustrating a system and method for providing illumination flash for image capture according to an exemplary embodiment of the camera in the invention.

FIG. 3 illustrates a diagrammatic view illustrating a system and method for providing illumination flash for image capture according to an exemplary embodiment of the camera system 10 in the invention. As shown, integrated within the camera 5, there is a direct flash unit 20a and at least one indirect flash unit 21a. The direct flash unit 20a operates to project light in a first direction 25 to illuminate an object 30 directly. The indirect flash unit 21a operates to project a flash of light in a second direction 26a toward an indirect reflecting surface 27 to reflect the flash of light in another direction 26b to indirectly illuminate the object 30.

That is, the light projected from the second indirect flash unit 21a travels along the second direction 26a and is reflected by the indirect reflecting surface 27 in the direction 26b toward object 30. The indirect reflecting surface 27 may be any surface capable of reflecting light in the environment surrounding the object 30. For example, an indirect reflecting surface 27 may be a wall and/or a ceiling in a room and/or any other type of reflecting surface capable of bouncing light onto the object 30 in accordance with this invention.

Unlike conventional cameras, which without an external component adapted thereto, are not capable of providing indirect bounce light. The camera system 10 of this invention includes integrated within the housing of the camera 5, separate flash units 20a, 21a for direct and indirect flash illumination. In particular, a first direct flash unit 20a may include, for example, a first power LED which is arranged to project a flash light beam directly at the object 30 in a first direction 25.

The indirect flash unit 21a may include a second power LED which is arranged to project a flash light beam 26a upward toward the indirect reflecting surface 27. It is to be understood that the indirect flash unit 21a may be positioned to project in any number of various indirect directions, such as laterally toward a side wall (which will serve as the reflecting surface) and/or against the ceiling or floor (which will also reflect the light). The indirect flash unit 21a projects the illuminating light at the object 30 indirectly to artificially simulate the untreated characteristics of natural sunlight. The direct flash could be implemented in certain situations to provide fill-in light to soften any dark shadows thereon.

The camera system 10 includes illumination sensors 31, 32. The illumination sensor 31 is used to detect the amount of light being reflected from the direct flash unit 20a or to detect the distance of the camera from the subject or object being photographed. Likewise, the illumination sensor 32 is used to detect the amount of light being reflected from the indirect flash unit 21a or to detect the distance of the camera from the reflecting surface 27 such as the ceiling. The illumination sensors 31, 32 may be made from a variety of different light absorbing and/or sensing devices, such as an emitter-detector sensor.

According to one exemplary embodiment, the illumination sensors 31, 32 may be used to emit and detect electromagnetic radiation reflected from the indirect reflecting surface 27 directly to the illumination sensor 32. The amount of light being reflected from the various surfaces is detected by the illumination sensors 31, 32 and converted into a signal containing information about the light reflecting properties of the indirect reflecting surface 27 and the electromagnetic radiation reflected directly back from the object 30 itself. Although not depicted in FIG. 3, flash unit 22a may also have a separate sensor for detecting reflected light, distance and generating a signal containing information from the reflecting surface the indirect flash and sensor are oriented towards.

Based on the signals received from the illumination sensors 31, 32, the controller 35 instructs to the flash units 20a, 21a, 22a a prescribed amount of power to supply to the flash units 20a 21a, 22a to optimize the emitted LED flash light on to the object 30 to produce a favorable image.

Various types of reflection and/or other modes for determining the amount of reflected light may be employed by this invention. For purposes of this exemplary embodiment, one exemplary method for collecting light by the illumination sensors 31, 32 is to emit and capture infrared radiation transmitted from the flash units 20a, 21a. Referring to FIG. 3 in particular, the illumination sensor 31 receives infrared radiation transmitted from the direct flash unit 20a along a path designated 25 from which it is reflected off of the object 30. Likewise, the illumination sensor 32 receives infrared radiation transmitted from the indirect flash unit 21 along a path designated 26d from which it is reflected.

From the reflected signal information returned, the controller 35 can determine various distances. That is, the illumination sensors 31, 32 may be equipped with features to ascertain the distance between various objects, such as the distance between the camera 5 and an indirect reflecting surface 27 and/or a distance between the camera 5 and the object 30 and/or any other length in accordance with this invention. Alternatively, distance sensor may be integrated within the camera as separate devices that perform the length determining function.

Based on this distance information, the camera system 10 can optimally adjust the amount of flash (by providing full power or by quenching the output of the flash illumination) that is to be required from the indirect flash unit 21a. The input back to the illumination sensor 31 can also indicate to the controller 35 that there may be no indirect reflecting surface relatively close enough to efficiently utilize the indirect flash unit 21a.

When a negligible signal is received by the illumination sensor 32 and returned to the controller 35, the controller 35 may instruct only the direct flash unit 20a to operate since the indirect flash unit 21a would have substantially little to no effect on the captured image. A negligible signal may be returned when, for example, an indirect reflecting surface is beyond a predetermined maximum distance which will permit effective indirect flash. However, if the indirect reflecting surface is at, or within, a predetermined maximum distance, the indirect flash unit 21a may be used in response to a power level instruction sent by the controller 35.

The information contained in the signal provided by illumination sensors 31, 32 is utilized by the controller 35 to provide automatic adjustment of flash output and camera settings. In the alternative, the automatic adjustment may be overridden and manually adjusted as desired by a user with a particular desired lighting preference.

FIG. 4 illustrates another aspect of individually, or with respect to each other, angularly adjusting the direction of the flash units 20a, 21a, 22a. In accordance with this invention, the direct 20a and/or indirect flash units 21a, 22a may be individually adjusted. As shown in FIGS. 3-5, the indirect flash light beam path 26a projected by indirect flash unit 21a is adjusted (rotated by $\theta_1$) to flash light beam path 26a (as shown in FIG. 5). Likewise, the flash light beam path 24a (as shown in FIG. 3) of the direct flash unit 20a may be adjusted (rotated by $\theta_2$) to project the flash light unit 20a in the adjusted flash light beam path 24j (as shown in FIG. 5).

The angular adjustments may be automatically modified by instructions from the controller 35 determined in response to various inputs received. The controller 35 may send instructions to an adjustment mechanism 38 attached to the direct 20a or indirect flash units 21a, 22a. As shown in FIGS. 4 and 5, the adjustment mechanism 38 includes a pivot mechanism attached to at least one motor (M). The instructions from the controller 35 cause the adjustment mechanism 38 to mechanically rotate the flash unit 21a within its compartment 39 an angle $\theta$ so as to optimally align a projection direction of the illuminating flash beam toward the object 30.

For example and as shown in FIG. 3, if the reflected light captured by the illumination sensor 31 indicates that the object 30a is close to the camera 5, the indirect flash unit 21a may be angled at a steep angle (as shown by paths 26e and 26f in FIG. 3) to optimize the amount of light reflected onto the object 30a. However, if the reflected light captured by the illumination sensor 32 indicates that the object 30b is further from the camera 5, the angle of projection of the indirect flash unit 21a may be lowered (as shown by paths 26g and 26h in FIG. 3) to optimize the amount of light reflected onto the object 30b. Further, the illumination sensor 32 will also determine the distance and reflectivity characteristics of the ceiling or reflective surface and the controller 35 can adjust the power to the light in combination with the angle or projection.

As discussed previously, the position sensor 60 is provided to determine the orientation (such as from a horizontal to a vertical position) of the camera 5. As the angle of the camera 5 changes from the horizontal to the vertical position, the side indirect flash unit 22a becomes reoriented by the movement of the camera 5 to the preferred indirect top flash unit in the position the indirect flash unit 21a previously was positioned. When more than one indirect flash unit is available for use, one of the indirect flash units may be preferred for use when the camera 5 captures the image. Based on various factors, including but not limited to, a determination made by the controller 35 (e.g., in response to other unknown reflectivity objects such as a wall, other objects and/or bystanders), the other indirect flash unit(s) may be turned off so that only one indirect flash unit is used. The determination to use one indirect flash unit over the other may be determined mechanically or electronically.

According to this invention, another advantage of aiming the direct flash at a slight off angle is so that the off-angle direct flash may reduce red-eye. This use may be desired, for example, when used in conjunction with indirect lighting.

Figure 6:
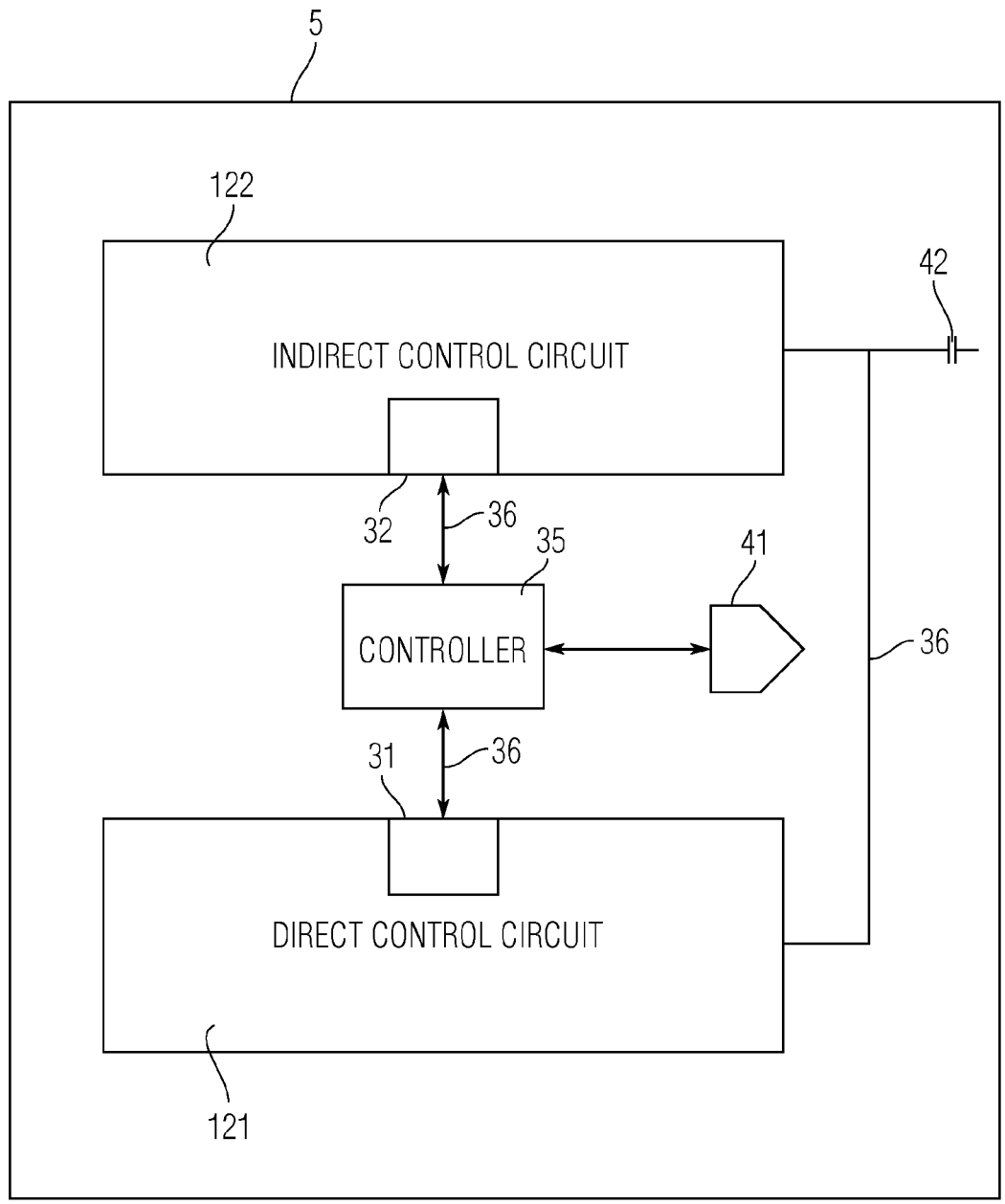
FIG. 6 illustrates an exemplary control circuit for the camera according to this invention.

FIG. 6 illustrates a control circuit diagram for the camera system 10. A battery source 42 provides power to the various components connected in the control circuit. A controller 35 is electrically connected within the circuit to a direct flash unit circuit 121. The controller 35 is also electrically connected with at least one indirect flash unit circuit 122. The battery source 42 may likely be tied into the power source that supplies the various camera features and functionality.

The illumination sensors 31, 32 are depicted attached to the controller 35 within the control circuit. The illumination sensor 31 is depicted electrically connected to the direct flash unit circuit 121, and the illumination sensor 32 is shown electrically connected to the indirect flash unit circuit 122. As mentioned previously, the illumination sensors 31, 32 may incorporate an emitter-detector sensor in which an ambient infrared radiation detector is provided within the camera system 10 as a point of reference for the controller 35 in evaluating and making a determination as to how much power should be sent to the direct and indirect flash units 20a, 21a, 22a during operation and/or whether to permit, quench and/or adjust the flash operation of the flash units 20a, 21a, 22a. As also mentioned previously, the illumination sensors 31, 32 may be used to collect various types of information, including but not limited to, the distance of the object 30 from the camera 5 and/or information regarding exposure settings (aperture and shutter speed).

The various components in the circuit diagram of the camera system 10 are electrically connected and designed to send and receive signal information to and from the controller 35 via various bus lines shown generally as 36. The controller 35 centrally coordinates the receipt of the information and instructions to the various components of the camera system. Various types of information may be received by the controller 35 from various inputs into the control circuit and will be discussed in more detail later.

A quenching flash circuit 41 is shown provided within the control circuit to regulate the power of the flash from the direct and indirect flash units 20a, 21a, 22a. That is, the power of a flash is regulated by quenching the flash before the capacitors are fully discharged. Although the phraseology for quenching is described, it is to be understood within this invention to allow for the halt of the flash mid exposure through, for example via a solid state circuit in the event that light sensors observe sufficient light has been achieved. Halting the flash may be accomplished by solid state circuitry (or other) that has the ability to open a circuit and halt a flash, whether manually or automatically. At least one source of quenching signals may utilize the distance information gathered from distance sensors. Other sources may use light coming from the scene in which the object 30 is located, all of which is well known to those skilled in the art.

Basic descriptions for trigger and quenching circuits for direct and indirect flash tubes (such as the interaction of a battery connected to a main capacitor and various resistors and SCR's connected in a trigger circuit) for an external attachment for a camera are known and are not the subject of this application and can be found in U.S. Pat. No. 5,136,312 and U.S. Pat. No. 4,384,238, the disclosures of which are hereby incorporated by reference.

Referring back to the controller 35, as with conventional cameras, the controller 35 receives various types of information as data signal inputs, such as for example: distance information from an auto-focus module, film speed data input, ambient light level from a photo-detector, ceiling or indirect reflecting surface detection, flash specification information yielding exposure information, information from a user interface (such as no flash, rapid recycle or no indirect flash) and various other types of information.

The controller 35 provides various control signal instructions, such as shutter speed, an F-number, indirect flash parameters, direct flash parameters, and various other control signals. According to this invention, the controller 35 can also instruct the flash units, such as the indirect flash units 21a, 22a how to orient the angle of projection based on the various inputs received to optimize the light around the object 30 being photographed.

It should be noted that the controller 35 may be preferably implemented as a central processor section having overall, system-level control, to performing various computations, functions and other processes related to the camera system 10. The various components in the control circuit associated with the processor 35 can be implemented as a single microprocessor circuit or a plurality of separate dedicated or programmable integrated or other electronic circuits or devices, e.g., hardwired electronic or logic circuits such as discrete element circuits or programmable logic devices. The control circuit may include other circuitry or components common in camera photography, such as memory devices, etc., to affect desired control and/or input/output functions from various input/output interfaces. The camera system 10 may include more than one controller for the various electronic components in accordance with this invention.

Programmable memory may be provided to receive and store the various data information and can also store one or more computer readable control routines used by the camera system 10. The memory can be implemented using any appropriate combination of alterable, volatile or non-volatile memory or non-alterable, or fixed, memory. The alterable memory, whether volatile or non-volatile, can be implemented using any one or more of static or dynamic RAM, floppy disk and disk drive, writable or re-writable optical disk and disk drive, hard drive, flash memory or the like. Similarly, the non-alterable or fixed memory can be implemented using any one or more of ROM, PROM, EPROM, EEPROM, an optical ROM disk, such as CD-ROM or DVD-ROM disk, and disk drive or the like.

Figure 7:
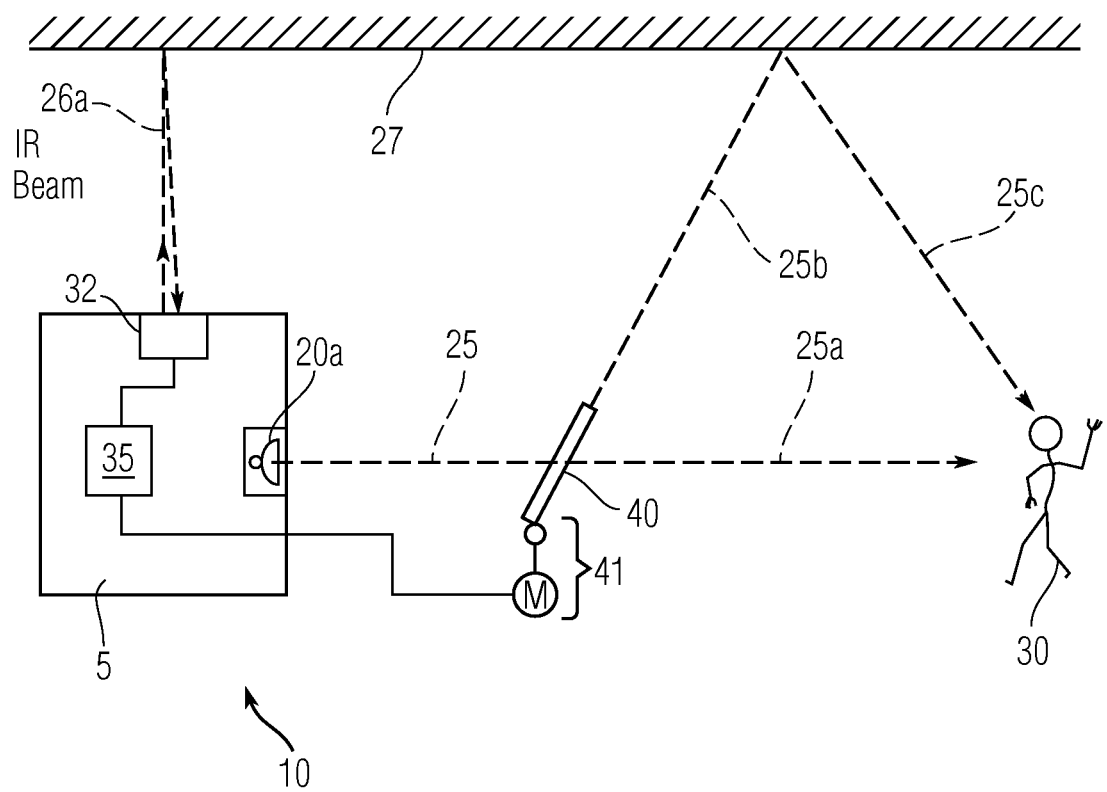
FIG. 7 depicts a diagrammatic view illustrating a camera integrated with a flash unit having flash beam splitting characteristic which divides a single flash into predetermined proportions in a first direct flash path and into a second indirect flash path in accordance with this invention.

FIG. 7 illustrates another exemplary embodiment in which the camera system 10 includes a single flash unit source and a beam splitter 40 that separates the flash light illumination into a direct flash beam and an indirect flash beam. Although depicted a distance away from the flash unit 20a, the beam splitter 40 is intended to be disposed within the camera 5. Alternatively, the beam splitter 40 may be implemented through the use of a reflective and diffusing surface such as a bounce card which is commonly used by professional photographers. The bounce card is a small surface which deflects light from the indirectly aimed flash unit towards the subject. The surface may be integral to the camera or constructed as an add on attachment. That is, the beam-splitter 40 deflects a portion of the flash LED light towards an indirect reflecting surface 27 and the remaining light is emitted along an axis defined directly between the lens of the camera 5 and the object 30.

In brief, if a suitable indirect reflecting surface 27 is not detected, the use of the beam-splitter 40 is omitted and all of the projected flash light is directed along the axis defined directly between the lens of the camera 5 and the object 30. In use, infrared radiation is emitted from an IR beam source included in the illumination sensor system 32 along a path designated 26a to surface 27. The IR beam source is reflected along a path back to illumination sensor 32. Information about the indirect reflecting surface 27 is embedded in the signal and provided back to the illumination sensor 32. If the surface 27 is not present, or is located beyond a predetermined distance, a beam splitter 40 is not employed and the direct flash light beam 25 is not separated and all of the flash light is illuminated directly on the object 30.

However, if the signal indicates the presence of surface 27 within a predetermined distance, the controller 35 adjusts a beam splitter 40 to functionally separate the direct flash unit 20a to deflect a portion of the incoming flash light 25 along a first direct path 25a and the remaining portion of the flash light along a second indirect path 25b. The flash light for the second indirect path 25b may be optimally used with a larger lens opening than that used for the direct flash mode where an equivalent flash range is desired to account for the longer path length that the indirect flash light beam has to travel and light loss associated with the bounced light.

The schematic diagram and the control circuit function shown in FIG. 7 are similar to the schematic diagram and the control circuit described above with the exception that a single direct flash unit 20a projects a single flash beam of light 25 that is separated by a beam splitter 40 into a first projected direct flash light beam 25a and a second indirect flash light beam 25b of indirect flash illumination that is reflected off of the indirect reflected surface 27.

In particular, when the beam splitter 40 is used, the incoming single flash beam of light 25 is split and projected, in part, in a first direction 25a toward the indirect reflecting surface 27 and reflected off back to the object 30. The second part of the incoming single flash beam of light 25 is further split in a direct path 25a in a second direction to directly illuminate the object 30.

The beam splitter 40 may be optimally adjusted by an electromechanical actuator 41 that operates to pivot the angle of the beam splitter 40. By angling the beam splitter 40, the proportionate amount of illuminated light split can be varied thereby modifying and splitting the incoming flash beam of light 25 as desired into a first direct flash beam of light 25a directed at the object 30 and a second indirect flash beam of light 25b, 25c indirectly hitting the object 30.

When the beam splitter 40 is not used, such as where indirect light is substantially ineffective, the beam splitter 40 will be predisposed in a first position to allow all of the flash light illumination to project directly onto the object 30. Although described as a beam splitter 40, the flash illumination device may be composed from any number of varying designs, such as a partially silvered mirror and/or a separator lens.

Figure 8:
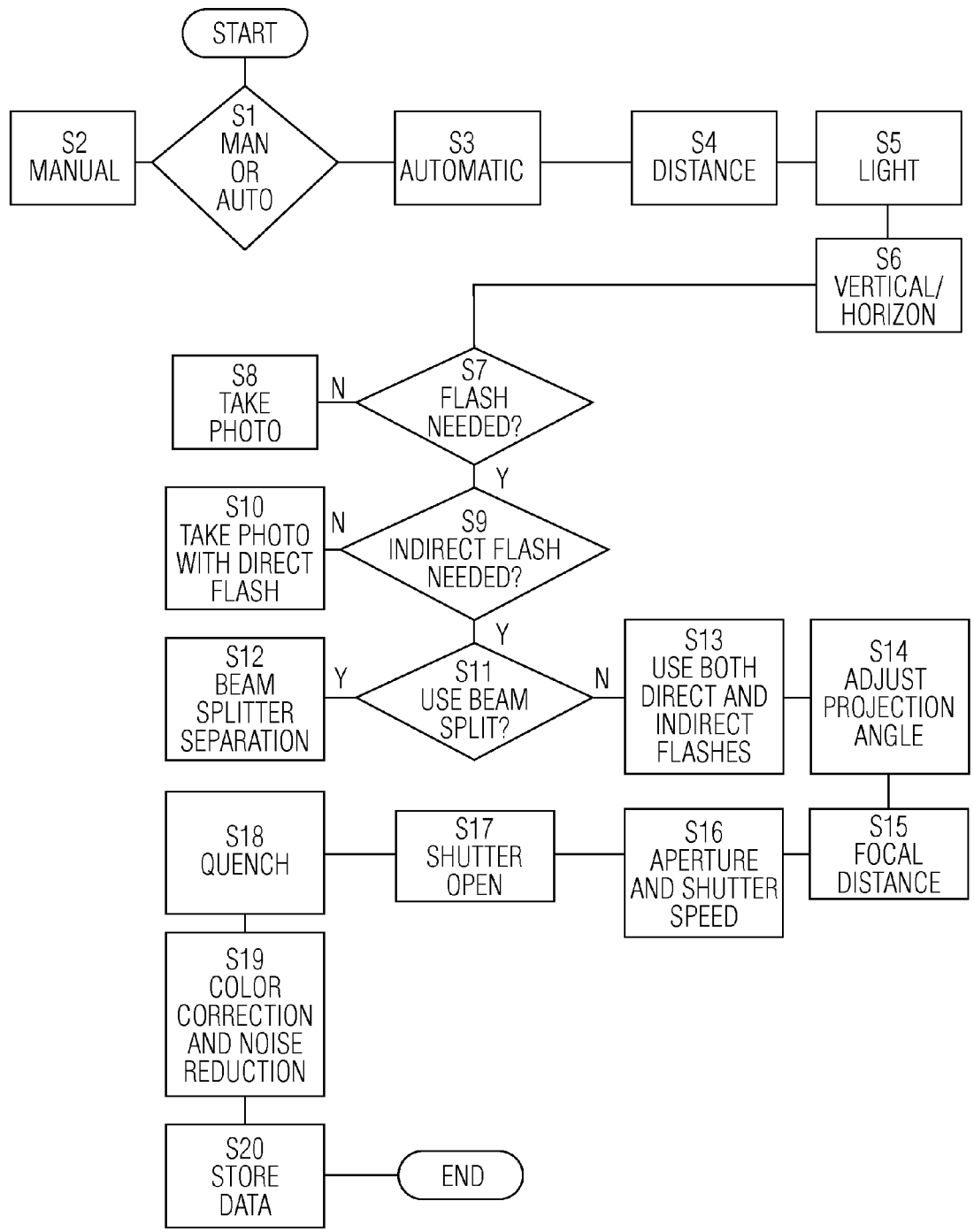
FIG. 8 illustrates an exemplary control routine process that takes place in accordance with this invention.

FIG. 8, illustrates an exemplary control routine process that takes place in accordance with this invention.

In Step S1, the control routine determines if the camera is being used in a manual or automatic mode of operation. If a manual mode of operation is being used, the routine proceeds to Step S2. However, if the automatic mode is selected, then the routine proceeds to Step S3.

In Step S2, manual override of settings may be selected. Manual override may be selected from a menu in the camera and/or may be actuated in response to a user manipulating the features on the camera, and/or some other overriding procedure. The control routine is highly adaptive and may include at least the following basic features. First, the user will be able to override the software (such as for example: turning the flash on/off, and/or causing the indirect/direct flash units to operate together or independently). The control routine is adapted to manipulate the flash power in response to detecting and analyzing the light already present and the various features and parameters discussed in more detail below.

Alternatively, in Step S3, manual override of setting is not selected and an automatic or auto-focus mode may be selected so that the camera setting may be optimally configured by an internal control program based on the various parameters described above. In operation, the shutter trigger switch (or image trigger button) on the camera is depressed and activates the automatic control routine according to this invention.

In the automatic mode, the control routine of this invention receives various bits of information and analyzes the information the various types of information received, such as for example: object and reflective surface distances (e.g., upward and side distances in the environment), light metering data, and vertical/horizontal positioning of the camera to determine how much light should be emitted and from which of various direct and indirect flash units.

The automatic flash mode selects an appropriate camera lens aperture and shutter speed based on a distance determined between the camera and the object and a determined flash output. The automatic flash mode will select a suitable aperture and shutter speed selection for the direct flash light mode. If an indirect reflective surface is detected having suitable reflective properties to enhance the object being photographed, an indirect and direct mode pair may be selected. In the case where beam splitting may be employed, larger lens openings may be suitably selected to offset the light losses and longer path length. The desired objective is to obtain uniform exposure of the object. In Step S2, when the shutter release button is depressed, distance and light sensors (Step S4) are initiated.

In Step S4, the distance sensors determine the various distances between the parameters surrounding the object to be photographed in a variety of directions (upward, sideways, bottom, forward)—as well as the distance between the camera and the object. The various distance information collected will establish a point of reference between the object and the camera and the surrounding environment.

The control routine can adapt to the varied distance of the object. The greater the distance the indirect bounce surface is located from the camera and/or the object, the more power the indirect flash will need to be charged or driven at when using non-capacitor circuit to illuminate the object being photographed. That is, the greater the distance, the stronger the indirect flash unit must illuminate the flash. Similarly, the direct flash unit will also increase its illumination of its flash as the distance of the object from the camera is increased.

In the alternative, sensors for determining distance and reflectivity for indirect flashes may be omitted and instead a low power pre-flash may be performed for each indirect flash independently and measure the light reaching the subject with existing light meters and feed information into flash/exposure software prior to the shutter opening. That is, rather than utilizing distance/light/reflectivity sensors on indirect light sources, the following alternative method can be employed to determine the power output of each indirect light source. Assuming the camera is in automatic mode, after the user presses the shutter release button, each flash unit source (direct and indirect) sequentially fires at low power. The camera's existing light sensor(s) (the one that is used for determining exposure) observes the amount of light that has reached the subject of the photograph from each of the flashes. This process may take many milliseconds. The camera then uses the sensor input along with other data received by the controller to determine the power output of each flash during the actual image capture. The shutter is then opened and the multiple flashes fire for image capture. The shutter is closed and the image is processed by the camera. The user presses the shutter release button once during this process and user may experience some shutter lag. Alternatively, the sensing process can occur when the user presses and holds the shutter release button at a mid-position allowing the user to exactly time the shutter release when he completely presses the shutter release button (this is a common feature of cameras to allow for pre-shutter release sensing of focus and exposure).

Circuitry will be included to allow a quench or immediate halt of the light emission of each flash unit if the control routine sends an instruction to the flash units. According to this alternative, flash bracketing could be employed by adjusting the emphasis of each of a predetermined number of flashes (e.g., three flashes) as well as the intensity of each in a sequence of photographs. The advantage of this step is that the nature of the LED flashes allows for numerous shots without the need for capacitor recharging. In the alternative to having three fixed LED flashes, a top flash may flip out at a predetermined angle, (e.g., approximately 90 degrees) to serve as in indirect side flash in response to the vertical/horizontal sensor commands. The routine then proceeds to Step S5.

In Step S5, a light meter determines the available and/or required light for proper exposure. The light meter may be comprised of any number of light sensors, such as an ambient light level sensor. In each of the various directions that the light meter takes samples, the light received is compared against the light transmitted to determine an optimal amount of light that is to be transmitted toward the object. The routine proceeds to Step S6.

In Step S6, a vertical/horizontal sensor is activated to determine the camera orientation. Once the orientation has been determined, the vertical/horizontal sensor returns that information in the form of a signal to a central controller. Various types of vertical/horizontal measuring sensors may be incorporated (such as an accelerometer or a gyroscope) to determine the orientation of the camera relative to the ground. The accelerometer can sense and determine the angular displacement using the direction of gravity for a vertical reference. Likewise, the vertical/horizon sensor may determine and selectively identify which indirect flash unit is directed towards a particular reflecting surface, such as the ceiling and may as a result shut down the other indirect flash units (in response to other unknown reflectivity objects such as a wall, other objects and/or bystanders). The routine proceeds to Step S7.

In Step S7, based on at least some of the information collected by the distance sensors, the light meter, and the vertical/horizontal sensor, the routine can make a determination as to whether a flash is needed. If no flash is needed because for example, the image is being taken during the day and ample sunlight is available, the routine proceeds to Step S8 and the picture is taken.

Otherwise, if a flash is needed, the routine proceeds to Step S9 in which it is further determined if an indirect flash illumination light would produce favorable results on the object being photographed. If the answer is determined to be no, then the routine then proceeds to Step S10 and the photograph is taken with direct flash only.

If however, it is determined in Step S9 that indirect flash lighting would be optimal, the routine proceeds to Step S11 in which the routine determines whether to use a split beam separator process of Step S12, or to employ the individual direct and indirect flash unit process as described in Step S13.

In Step S12, a beam splitter that separates a single flash light illumination into a direct flash beam and an indirect flash beam. As described earlier, a portion of the direct flash is separated towards an indirect reflecting surface and the remaining light is emitted along an axis defined directly between the lens of the camera and the object.

In the alternative, if a suitable indirect reflecting surface is not detected, the use of the beam-splitter is omitted and all of the projected flash light is directed along the axis defined directly between the lens of the camera and the object.

In Step S13, the individual direct and indirect flash unit process is selected. The routine will now decide at what power level the direct and indirect flashes will be instructed to project optimal lighting onto the object being photographed. The power level and/or amount of light to be output by each of the flash units (e.g., light emitting diodes (LEDs)) is determined and that information is collected by a central controller.

In more detail, an IR is emitted from the distance sensors along a first path to an indirect reflecting surface. The distance sensors receives the infrared radiation reflected from indirect reflecting surface along a return path and an output signal indicative of the distance between indirect reflecting surface and the illumination sensor is sent to the controller. Information about the lighting and exposure conditions is also received.

In this exemplary embodiment, it is determined that the indirect reflecting surface is within a predetermined distance from the camera and the indirect flash unit is actuated, or ionized, for use.

Likewise, operation of the direct flash unit is substantially similar to the operation described above with respect to the indirect flash unit. That is, when the indirect reflecting surface determined to be within a predetermined distance of the camera, the controller may send a command instruction to pivot the indirect flash unit to an optimal determined angular direction as discussed in Step S14. The instruction may be received by an adjustment mechanism that will reposition the projection of the indirect flash unit to optimally project the illuminating flash light on to the object. The controller will then instruct both the direct flash unit and the indirect flash unit to fire simultaneously and illuminate the object.

However, if it is determined that the indirect flash unit would be negligible on the object being photographed, the indirect flash unit will be rendered inoperable for efficiency sake. The routine will then proceed to Step S14 and the picture will be taken with the direct flash only.

In Step 13, when the direct and indirect flash units are charged to the predetermined level, the flash units are ready to be discharge the flash and to produce the indirect flash in a direction at an angle suitable to reflect onto the object. The routine proceeds to Step S14.

In Step S14, based on the information collected by the various distances and light meters, an optimum angle of indirect light projection is determined. The central controller instructs an adjustment mechanism to angularly adjust the axial projection of the intended flash against the indirect surface to optimally reflect flash lighting on the object to cast favorable light onto the object when the shutter opens to capture the image of the object.

In Step S15, the focal distance of the camera lens is set by an auto-focus motor according to the distance determined between the camera and the object. Alternatively, focal distance can be determined by a through-the-lens (TTL) process that optimizes edge contrast of the image and is a method currently employed within the industry. In another exemplary alternative, a motorized lens or mirror may be attached to each flash unit to adjust the focal distance or angle based on the bounce distance required to project on the object. It is to be understood that multiple focal length flashes may be embodied in each flash unit. Alternatively, numerous LEDs may be positioned on, for example, a ¼ sphere (like the eye of a fly) to serve as an array for the direct and indirect flashes. In each flash unit, varying color spectrum LEDs may be added to allow for creative lighting effects. The routine proceeds to Step S16.

In Step S16, the aperture and shutter speed of the camera are determined in response to the various information collected and signaled to the central controller. The control routine may operate in response to a variety of different types of flash/exposure software. The routine proceeds to Step S17.

In Step 17, the shutter opens and light from the light emitting diodes (LED) flash units is projected onto the object and optimal lighting is received by the film/digital sensor to impress an image of the object. The routine monitors the exposure light of the image while the shutter is open to capture the image. The shutter remains open for a predetermined duration of time. Once it is determined that proper exposure has been achieved prior to shutter close, all flashes are quenched. The routine proceeds to Step S18.

In Step S18, the quench command signal appears to inhibit the flash. The quenching command regulates the power of the flash from the direct and indirect flash units. It is within the scope of this invention to allow for the halt of the flash mid exposure through, e.g., via a solid state circuit in the event that light sensors observe sufficient light has been achieved. The halting of the flash may occur manually or automatically. The routine then proceeds to Step S19.

In Step S19, color correction and noise reduction may be applied to the captured image of the object. Conventional techniques and software may be applied. The routine proceeds to Step S20.

In Step S20, the data is stored (and/or film is advanced) to media and photo is complete. The routine proceeds to Step S21 and the process ends.

Although various steps are described above according to the exemplary method of this invention, it is to be understood that some of the steps described above may be omitted, and others may be added without departing from the scope of this invention.

Various alternatives are possible in accordance with this invention. For example, the LEDs may be constructed as removable indirect hot shoe flash attachment that is compact and not powered by its own battery. The advantage of this reduced size of the LED flash attachment is that the attachment can remain attached to the hot shoe in a compact manner. This may involve redesign hot shoe mounts to allow power pass through from the main battery of the camera to the shoe-mounted flash.

The systems and methods of this indirect flash systems may be adapted for use with other small electronic devices capable of still or video photography, such as for example, PDAs, cell phones, computers.

It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed is:

1. A camera, comprising:
    a camera housing;
    a lens to capture a photograph;
    a direct flash unit within the housing including a flash light emission window arranged to project direct illumination toward an object to be photographed;
    an indirect flash unit within the housing including an indirect flash light emission window arranged to project indirect bounce illumination at a surface to the object;
    a sensor for monitoring image lighting;
    a processor which receives a signal from the sensor and controls the amount of light from direct flash unit and the amount of light from the indirect flash unit based upon the image lighting measured from the light output by the direct flash unit;
    the image lighting measured from the light output by the indirect flash unit; and wherein the sensor monitors the image lighting during a preflash of the indirect flash unit and a preflash of the direct flash unit.

2. The camera according to claim 1, wherein the sensor is a digital image sensor.

3. A camera, comprising:
    a camera housing;
    a lens to capture a photograph;
    a direct flash unit within the housing including a flash light emission window arranged to project direct illumination toward an object to be photographed;
    an indirect flash unit within the housing including an indirect flash light emission window arranged to project indirect bounce illumination at a surface to the object;
    a sensor for monitoring image lighting;
    a processor which receives a signal from the sensor and controls the amount of light from direct flash unit and the amount of light from the indirect flash unit based upon the image lighting measured from the light output by the direct flash unit; and
    image lighting measured from the light output by the indirect flash unit, wherein the sensor monitors the image lighting during a live feed which includes an indirect flash unit preflash and a direct flash unit preflash.

4. A method of providing flash illumination for a camera with a direct flash unit and an indirect flash unit within the camera housing, comprising:
    receiving an input to initiate the capture of an image;
    capturing a live feed of image data;
    initiating a preflash of the direct flash unit;
    analyzing the lighting measured from the live feed image during the preflash of the direct flash unit;
    initiating a preflash of the indirect flash unit;
    analyzing the lighting measured from the live feed image during the preflash of the indirect flash unit;
    determining the amount of light to be provided by the direct flash unit and the indirect flash unit based upon the live feed analysis; and
    controlling the amount of light provided by the direct flash unit and the indirect flash unit based upon the determined amount of light to be provided.

5. The method of claim 4, wherein the receiving a live feed of image data is by a digital sensor.

6. The method of claim 4, wherein the initiating a capture of the image is an initiating of the capture of a video.

7. A method of providing flash illumination for a camera with a direct flash unit within a camera housing and an indirect flash unit within the camera housing, comprising:
    receiving an input to initiate the capture of an image;
    initiating a low power pre-flash of the direct flash unit;
    sensing the amount of light in the image from the direct flash unit preflash;
    initiating a low power pre-flash of the indirect flash unit;
    sensing the amount of light in the image from the indirect flash unit preflash;
    determining the amount of light to be provided by the direct flash unit and the indirect flash unit based upon the amount of sensed light; and
    initiating a flash of the direct flash unit and indirect flash unit at the determined light levels while capturing the image.

8. A method of providing flash illumination for a camera with a direct flash unit within a camera housing and an indirect flash unit within the camera housing, comprising:
  receiving an input to initiate the capture of an image;
  capturing a live feed of image data
  initiating a pre-flash of the direct flash unit;
  analyzing the lighting of the live feed of image data during the pre-flash of the direct flash unit;
  initiating a pre-flash of the indirect flash unit;
  analyzing the lighting of the live feed of image data during the pre-flash of the indirect flash unit;
  determining the amount of light to be provided by the direct flash unit and the indirect flash unit based upon the live feed lighting analysis; and
  initiating a flash of the direct flash unit and indirect flash unit at the determined light levels while capturing the image.

9. A method of providing flash illumination for a camera with one or more flash units within the housing capable of projecting both direct illumination and indirect illumination:
  receiving an input to initiate the capture of an image;
  initiating a low power pre-flash of direct flash illumination;
  sensing the amount of light in the image from direct flash illumination;
  initiating a low power pre-flash of indirect flash illumination;
  sensing the amount of light in the image from indirect flash illumination;
  determining the amount of direct flash illumination and indirect flash illumination to be provided based upon the amount of sensed light; and
  initiating a flash of the one or more flash units at the determined light levels while capturing the image.

10. The method of claim 9, wherein the one or more flash units consists of an indirect flash unit and direct flash unit.

11. The method of claim 9, wherein the one or more flash units consists of one or more direct flash units and a filter.

12. The method of claim 11, wherein the filter is a beam splitter.

13. The method of claim 11, wherein the filter is a mirror.

14. The method of claim 11, wherein the filter is a separator.

15. The method of claim 9, further including the steps of:
  creating and receiving a live feed of image data;
  analyzing the live feed during the direct and indirect pre-flash of the indirect flash illumination for determining the amount of direct and indirect light illumination.

16. A method of providing flash illumination for a camera with one or more flash units within the housing capable of projecting both direct illumination and indirect illumination including the steps of:
  receiving an input to initiate the capture of an image;
  capturing a live feed of image data;
  analyzing the lighting of live feed image data during a direct preflash illumination and an indirect preflash illumination;
  determining the amount of light to be provided by the direct flash illumination and indirect flash illumination based upon the live feed analysis; and
  controlling the one or more flash units to provide the determined amount of direct illumination and indirect illumination while capturing the image.

17. The method of claim 16, wherein the one or more flash units consists of an indirect flash unit and direct flash unit.

18. The method of claim 16, wherein the one or more flash units consists of one or more direct flash units and a filter.

19. The method of claim 18, wherein the filter is a beam splitter.

20. The method of claim 18, wherein the filter is a mirror.

21. The method of claim 18, wherein the filter is a separator.

* * * * *